United States Patent
Martinelli et al.

(10) Patent No.: US 6,584,261 B2
(45) Date of Patent: Jun. 24, 2003

(54) OPTICAL GATING APPARATUS AND METHODS

(75) Inventors: Mario Martinelli, S Donato Milanese (IT); Andrea Zappettini, Reggio Emilia (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/988,624

(22) Filed: Nov. 20, 2001

(65) Prior Publication Data

US 2002/0090185 A1 Jul. 11, 2002

Related U.S. Application Data

(60) Provisional application No. 60/253,075, filed on Nov. 28, 2000.

(30) Foreign Application Priority Data

Nov. 22, 2000 (EP) ............................................. 00310375

(51) Int. Cl.$^7$ ............................... G02B 6/00; H01S 3/30

(52) U.S. Cl. ...................... 385/122; 385/142; 385/141; 372/6; 359/341.5

(58) Field of Search ............................... 385/122, 141, 385/147, 142, 123, 24, 27; 372/6, 70; 359/341.5, 341.33

(56) References Cited

U.S. PATENT DOCUMENTS

| | | | |
|---|---|---|---|
| 3,242,440 A | 3/1966 | Koester et al. | |
| 5,247,529 A | 9/1993 | Heidemann | 372/23 |
| 5,690,735 A | 11/1997 | Becker | 117/35 |
| 5,717,517 A | 2/1998 | Alfano et al. | 359/342 |
| 6,297,179 B1 | * 10/2001 | Beall et al. | 385/141 X |

OTHER PUBLICATIONS

A. Sennaroglu et al., "EFFICIENT CONTINUOUS–WAVE CHROMIUM–DOPED YAG LASER," J. Optical Society of America B, vol. 12, No. 5, pp. 930–937, (1995).

P. Myslinski et al.; "REMOTE ALL–OPTICAL NANOSECOND GAIN SWITCHING OF AN ERBIUM–DOPED FIBER AMPLIFIER," Fiber and Integrated Optics, vol. 14, pp. 83–88 (1995).

P. Myslinski et al.; "NANOSECOND ALL–OPTICAL GAIN SWITCHING OFAN ERBIUM–DOPED FIBER AMPLIFIER" Optics Communication, vol. 97, pp. 340–346 (1993).

I. T. McKinnie et al.; "DYNAMICS OF GAIN–SWITCHED Cr:Yag Lasers", SPIE, vol. 3265, pp. 295–305, (1998).

I. T. McKinnie et al.; "TEMPORAL CHARACTERISTICS AND DYNAMICS OF GAIN–SWITCHED Cr:Yag Lasers", Pure Appl. Opt., vol. 6, pp. 759–772, (1997).

Y. Kalisky et al,; "$Cr^{4+}$ DOPED GARNETS: NOVEL LASER MATERIALS AND NON–LINEAR SATURABLE ABSORBERS", Optical Materials, vol. 8, pp. 129–134, (1997).

(List continued on next page.)

Primary Examiner—Phan T. H. Palmer
(74) Attorney, Agent, or Firm—Finnegan, Henderson, Farabow, Garrett & Dunner, L.L.P.

(57) ABSTRACT

An apparatus for gating an optical signal comprising: an input stage arranged to receive and combine first and second optical control signals (ON, OFF) of first and second wavelengths, and an optical signal (SIGNAL IN) to be gated of a third wavelength. A gain medium is arranged to receive the signals SIGNAL IN, ON and OFF from the input stage. The gain medium (e.g. YAG) comprises a transition metal dopant (e.g. $Cr^{4+}$) that has an excited state populatable by the first control signal and depopulatable by the second control signal to allow selective amplification of the optical signal to be gated by stimulated emission from the excited state responsive to the control signals. The amplification process has a very fast switch-on time that is several orders of magnitude faster than in prior art devices based on the rare earth dopant $Er^{3+}$.

21 Claims, 4 Drawing Sheets

OTHER PUBLICATIONS

O. Svelto; "PRINCIPLES OF LASERS", Third Edition, New York Press, pp. 62–65, (1989).

S. Ishibashi et al.; "Cr, Ca: $Y_3Al_5O_{12}$ LASER CRYSTAL GROWN BY THE LASER-HEATED PEDESTAL GROWTH METHOD", Journal of Crystal Growth, vol. 183, pp. 614–621, (1998).

A. Suda et al.; "ABSORPTION AND OSCILLATION CHARACTERISTICS OF A PULSED $Cr^{4+}$; YAG LASER INVESTIGATED BY A DOUBLE-PULSE PUMPING TECHNIQUE", IEEE Journal of Quantum Electronics, vol. 35, No. 10, pp. 1548–1553, (1999).

A. A. Kaminskii; CRYSTALLINE LASERS: PHYSICAL PROCESSES AND OPERATING SCHEMES, p. 52, Fig. 1.17 & p. 29, Table 1.10, CRL Press, New York (1996).

S. Kueck et al., "NEAR-INFRARED EMISSION OF $Cr^{4+}$ DOPED GARNETS: LIFETIMESK, QUANTUM EFFICIENCIES, AND EMISSION CROSS SECTIONS", Physical Review B, vol. 51, pp. 17323–17331, (1995).

T. Kellner et al.; "PASSIVE Q SWITCHING OF A DIODE-PUMPED 946–nm Nd:YAG LASER WITH 1.6–W ABERAGE OUTPUT POWER", Applied Optics, vol. 37, pp. 7076–7086 (1998).

* cited by examiner

OPTICAL GATING APPARATUS AND METHODS

CROSS REFERENCE TO RELATED APPLICATIONS

This application claims the benefit of U.S. Provisional Application No. 60/253,075, filed Nov. 28, 2000, the content of which is incorporated herein by reference, and claims the right to priority based on European Application No. 00310375.1, filed Nov. 22, 2000.

BACKGROUND OF THE INVENTION

The invention relates to optical apparatus and methods for switching optical signals, more especially to apparatus and methods for switching optical signals by a gating process.

In optical telecommunications, three separate wavelength ranges ("windows") have been identified for transmitting optical signals, these windows corresponding to spectral regions where the attenuation and dispersion properties of light through silica optical fibers are favorable. The first window is centered at 0.9 microns. The second window is centered at 1.3 microns. The third window is centered at 1.55 microns. It is the second and third windows which are perhaps the most important commercially.

Optical switches are a fundamental component for optical communications networks. Optical switches can be controlled electrically (opto-electronic switching) or optically (all-optical switching). Opto-electronic switching is limited in speed by the bandwidth of electronic drive circuits to about 10 Gb/s, whereas all-optical switching can be much faster, e.g. 100 Gb/s.

An all-optical switch based on an erbium-doped fiber has been proposed [3,4]. Usefully, this optical switch is operable in the typical wavelength range of amplification of the $Er^{3+}$ions (1530–1560 nm) used in erbium-doped fiber amplifiers (EDFAs). However, the rise time of the switching in this erbium-doped device is rather slow, being in the tens of microseconds range. The switch-on time of amplification is intrinsically limited to 7 µs or more due to the long fluorescence lifetime of erbium ions in glass. As a result, rapid optical switching, e.g. of packets or trains of pulses, as would be desirable for a packet switching network such as an ATM (Asynchronous Transfer Mode) network, is not possible. The opening time of such switches is simply too long.

It is therefore an aim of the invention to provide an optical switch capable of switching at high speed, in particular in the second and/or third telecommunications windows.

SUMMARY OF THE INVENTION

According to a first aspect of the invention there is provided a method of gating an optical signal comprising:

(a) inputting an optical signal to be gated into a gain medium comprising a transition metal dopant;

(b) applying a first control signal to the gain medium to populate an excited state of the transition metal dopant, thereby to induce amplification of the optical signal by stimulated emission; and (c) applying a second control signal to the gain medium to depopulate the excited state of the transition metal dopant, thereby to suppress the amplification of the optical signal.

It has been discovered that transition metal doped materials, such as $Cr^{4+}$or $V^{3+}$doped crystals can be used as the basis for optical switching. More specifically, it has been realized that transition metal dopants can provide amplification that can be switched on and off very rapidly in comparison to $Er^{3+}$rare-earth dopant based optical switching where the switch-on is inherently slow.

With transition metal dopants, the rise-time of the amplification process is limited only by: (a) the duration of the first control signal which is operable to provide an "on" pulse; and (b) the time for the excited electrons to relax to the lowest level of the excited state, this time generally being short for transition metal dopants (in contrast to the rare earth dopant $Er^{3+}$which has a much slower relaxation time). For example, the relaxation time is known to be only a few picoseconds in the case of the $^3T_2$ state of $Cr^{4+}$in a YAG (Yttrium Aluminum Garnet: $Y_3Al_5O_{12}$) host crystal [1] and it is this picosecond relaxation time that will define the ultimate speed limit of $Cr^{4+}$:YAG based embodiments of the invention. Importantly, the short rise-time allows a transition metal doped switch to be used to gate trains of high frequency signal pulses, such as occur in an optical packet switching network, for example.

To the inventors' knowledge, there is no description or suggestion in the prior art that transition metal doped crystals could be used for optical switching, although it is known to the inventors that $Cr^{4+}$:YAG has been used as laser rod material [1, 5, 6, 11].

It has also been realized that transition metal dopants have a further significant advantage over rare earth dopants in that, with a transition metal, the basic atomic electronic levels are broadened out into bands by the presence of the host crystal to a much greater extent than for rare earth dopants which are relatively unaffected by their host crystal. As a result, a transition metal dopant based device can provide a relatively broad wavelength range for amplification. In the specific example of $Cr^{4+}$:YAG, amplification occurs over a highly desirable broad band extending between about 1.3–1.6 microns, spanning both the second and third telecommunications windows.

In the first aspect of the invention, the first control signal may be provided by a first light source having an output at a first wavelength at which there is a first allowed optical transition of the transition metal dopant into the excited state. The second control signal may be provided by a second light source having an output at a second wavelength at which there is a second allowed optical transition of the transition metal dopant out of the excited state. The optical signal to be gated may be provided by a third light source of any wavelength within the amplification band of the gain medium. In a preferred embodiment of the invention, the gain medium provides amplification over a wavelength range encompassing one or both of the second and third telecommunications windows. The first and second control signals are preferably optical, although electrical or other excitation may be possible with some materials.

According to a second aspect of the invention there is provided an apparatus for gating an optical signal comprising:

(a) an input stage arranged to receive and combine first and second optical control signals of first and second wavelengths, and an optical signal to be gated of a third wavelength;

(b) a gain medium arranged to receive from the input stage the first and second optical control signals and the optical signal to be gated, the gain medium comprising a transition metal dopant that has an excited state populatable by the first optical control signal and depopulatable by the second optical control signal to allow selective amplification of the optical signal to be gated by stimulated emission from the excited state responsive to the first and second optical control signals; and (c) an output stage for transmitting the optical signal after gating in the gain medium.

The apparatus of the second aspect of the invention may further comprise: a first light source for generating the first optical control signal at a first wavelength for populating the excited state of the transition metal dopant so as to provide amplification of the optical signal at the third wavelength; and/or a second light source for generating the second optical control signal at a second wavelength for depopulating the excited state of the transition metal dopant so as to suppress amplification of the optical signal at the third wavelength. In some embodiments, one or both of the first and second light sources can be integrated with the gain medium to form a single component. In other embodiments, one of both of the first and second light sources may be provided separately from the gain medium, e.g. remotely to allow remote operation of the active part of the apparatus.

The apparatus may be a free-space apparatus, an optical fiber based apparatus or a planar waveguide based apparatus, as desired. In addition, the apparatus may be a hybrid mixture of free-space, fiber and/or solid state waveguide components. In one embodiment, at least one of the gain medium, the input stage and the output stage are located in an optical fiber. In another embodiment, at least one of the gain medium, the input stage and the output stage is located in a planar waveguide. One or more of the light sources may also be integrated with these components in an integrated fiber or planar waveguide component, e.g. optical fiber lasers or solid state lasers.

In embodiments of the invention, it is useful to provide a filter for filtering out the first and second control signals from the optical signal after passing through the gain medium so that the output from the gating device is substantially free of control ignal components.

In the best mode of the invention, the transition metal dopant is $Cr^{4+}$ and the gain medium comprises YAG as a host crystal for the transition metal dopant. Other transition metal dopants such as $V^{4+}$ may also be suitable. Moreover, for any given transition metal dopant, different host crystals may be selected to change the energies of the same quantum transitions, thereby allowing a degree of selection of the wavelength range over which amplification occurs. Specifically, further embodiments are contemplated using $Cr^{4+}$ in hosts other than YAG, for example in other garnets. The design freedom provided by selection of the host for a given transition metal dopant is not available with rare-earth dopants, such as the $Er^{3+}$ used in the prior art [3, 4], since the transition energies of rare-earth dopants are substantially unaffected by changes of host crystal, owing to the electronic shell configuration of the rare earths.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
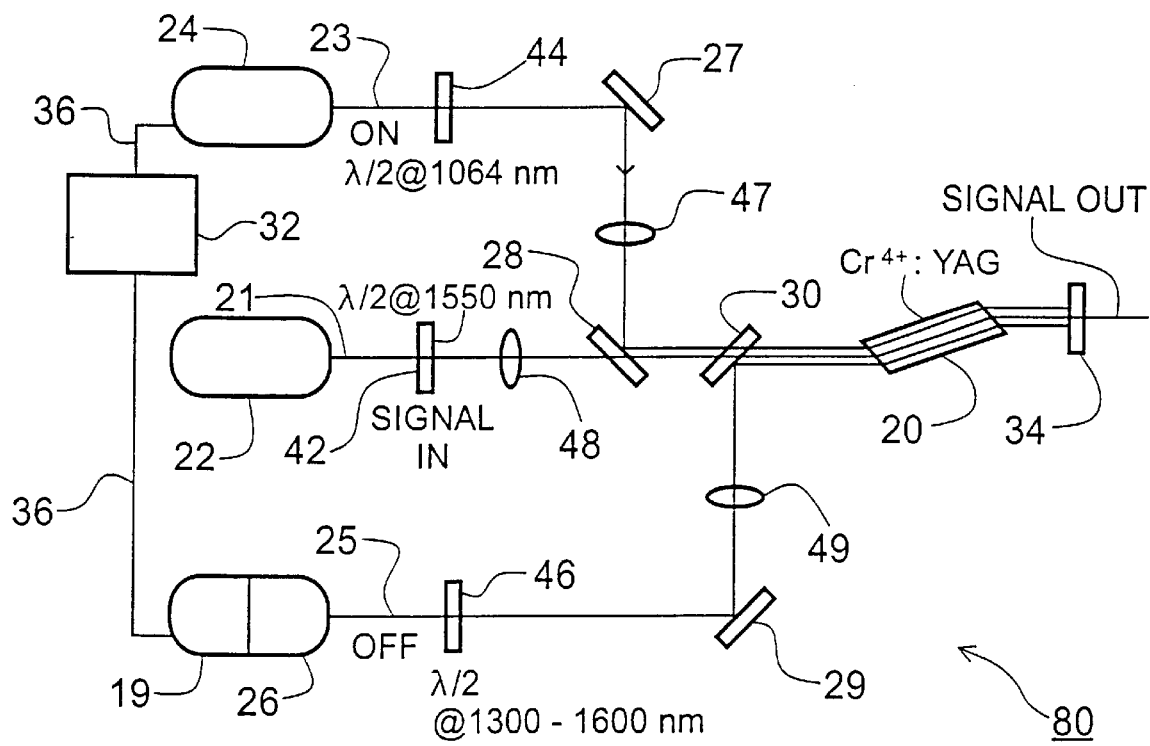
FIG. 1 shows an optical gating apparatus according to a first embodiment of the invention.

FIG. 1 shows schematically an apparatus according to a first embodiment of the invention. The apparatus is an optical gain generator (OGG) 80 based on free-space light propagation. The apparatus comprises three light sources 22, 24 and 26 operable to output respective light beams 21, 23 and 25 at three different wavelengths. Light sources 24 and 26 are triggered in use by a control unit 32 via electrical lines 36. A collection of optical elements 42, 44, 46, 27, 28, 29, 30, 47, 48 and 49 (described in detail further below) is arranged to combine the three beams 21, 23 and 25 for incidence onto a gain medium 20.

The gain medium 20 is a $Cr^{4+}$:YAG (Yttrium Aluminum Garnet: $Y_3Al_5O_{12}$) crystal. This type of crystal has been used previously as a laser gain medium for lasing in the spectral range 1350–1550 nm [1, 5, 6, 11], but to the inventors' knowledge has not previously been used for any optical switching applications. The $Cr^{4+}$:YAG crystal 20 is a single <1,0,0> oriented crystal rod of dimensions 5×5×25 mm. The crystal is cut at the Brewster angle for 1064 nm radiation, which is the wavelength of light beam 23.

In more detail, the light source 22 is a diode laser which is tunable to operate around a wavelength of 1.5 μm. The light source 24 is a Q-switched laser operating at a wavelength of 1064 nm. The light source 26 is a BBO (Beta-Barium Borate: β-$BaB_2O_4$) based optical parametric oscillator (OPO) operating at a wavelength of 1.45 μm. The light source 26 is arranged to be pumped by the third harmonic of a Q-switched Nd:YAG laser 19. The control unit 32 comprises a pulse generator employed to drive the two pulsed lasers 24 and 26 in such a way to provide a predetermined delay between their pulses.

Waveplates 42, 44 and 46 are arranged to control the polarization state of the respective light beams 21, 23 and 25. Lenses 48, 47 and 49 are arranged to focus respective light beams 21, 23 and 25 onto the $Cr^{4+}$:YAG crystal 20. A mirror 27 is arranged to direct light beam 23 after passage through the waveplate 44 onto a first dichroic beamsplitter 28 via the lens 47 which is placed between the mirror 27 and the dichroic beamsplitter 28. The light beam 21 is passed through waveplate 42 and lens 48 and superimposed with the light beam 23 on the first dichroic beamsplitter 28. A mirror 29 is arranged to direct light beam 25 after passage through the waveplate 46 onto a second dichroic beamsplitter 30 via the lens 49 which is placed between the mirror 29 and the second dichroic beamsplitter 30. The second dichroic beamsplitter 30 is arranged to receive light beams 21 and 23 from the first dichroic beamsplitter 28 as well as light beam 25 from the lens 49, and to direct all three beams 21, 23 and 25 to propagate along substantially the same path through the $Cr^{4+}$:YAG crystal 20. Subsequent to the gain medium 20, a third dichroic beamsplitter 34 is arranged to filter out light beams 23 and 25 from the light beam 21, which is transmitted as an output signal from the apparatus.

Figure 2:
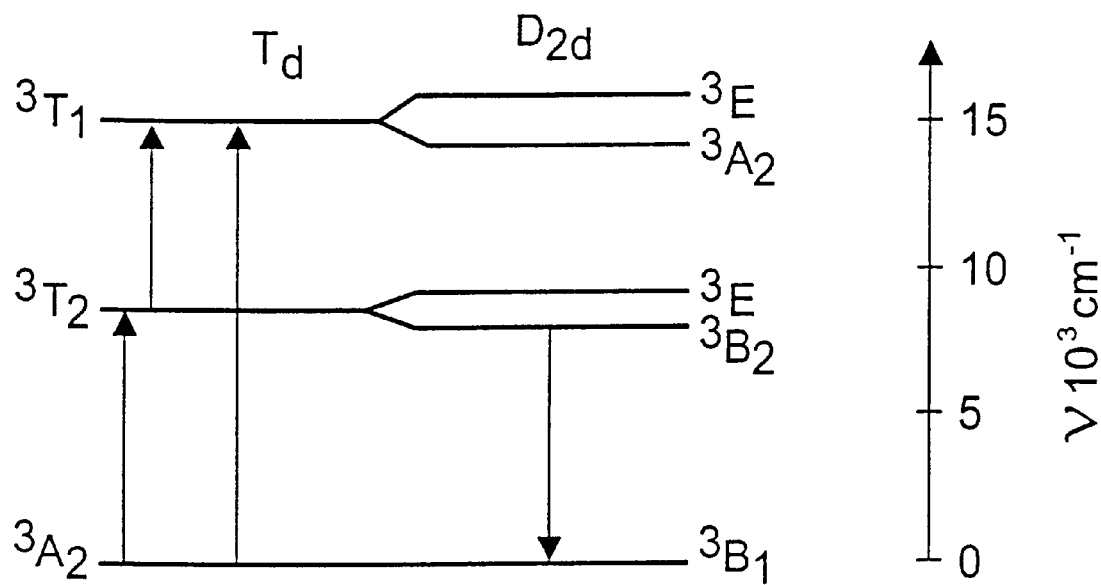
FIG. 2 shows an energy-level diagram of the $Cr^{4+}$ ion with $2d^2$ electron configuration and $D_{2d}$ point group symmetry.

FIG. 2 shows an energy level diagram of $Cr^{4+}$. The left-hand side of the diagram ($T_d$ point group) is applicable to $Cr^{4+}$, whereas the right-hand side shows the lifting of degeneracy that results from tetrahedral coordination, such as is found in a YAG host crystal ($D_{2d}$ point group). The diagram is included to assist explanation of the optical transitions relevant to operation of the apparatus of FIG. 1. The diagram shows allowed transitions between energy levels with solid arrows, it being noted that not all of these allowed transitions are actively exploited in operation of the apparatus, as will be appreciated from the following explanation.

To initiate switching, a pulse of the light beam 23 from the laser 24 at a wavelength of 1064 nm is applied. This pulse causes absorption from the $^3A_2/^3B_1$ state to the $^3T_2$ state and population of the $^3B_2$ state via rapid non-radiative relaxation (e.g. by phonons).

As a result of populating the excited $^3B_2$ state, the signal to be gated (light beam 21 output from the laser 22 at a wavelength of 1.55 μm) is amplified by stimulated emission from the $^3B_2$ state to the $^3B_1$ state. In $Cr^{4+}$:YAG, this transition is centered at around 1.5 microns, but extends between about 1.3–1.6 microns to provide amplification across both the second and third telecom windows. This is a highly desirable range of amplification as will be appreciated. (As discussed further below, host crystals other than YAG can be chosen to provide a variety of amplification ranges).

Since the pulse of the light beam 23 from laser 24 is the initiator of the amplification process of the light beam 21, it is referred to as the "on" pulse in the following, the light beam 21 being referred to as the "signal".

In the absence of any further inputs, the level of amplification of the signal will gradually decrease according to the natural depopulation of the excited $^3B_2$ state, which is metastable, having a relaxation time of approximately 3.4 μs. (By contrast, the comparable relaxation time for rare earth elements such as $Er^{3+}$is of the order of milliseconds). Amplification can however be sustained for longer periods by application of further "on" pulses, or by applying an "on" pulse of extended duration.

Importantly, it is also possible to switch off the amplification much more rapidly than according to the natural depopulation process. Namely, rapid off switching is achieved by applying a pulse of the light beam 25 from the light source 26 at 1.45 μm to depopulate the $^3B_2$ state by stimulated emission, using the allowed transition indicated for the $T_d$ point group from the $^3T_2$ state to the $^3A_2$ state. The pulse of light beam 25 from the light source 26 is thus referred to as the "off" pulse in the following.

Figure 3:
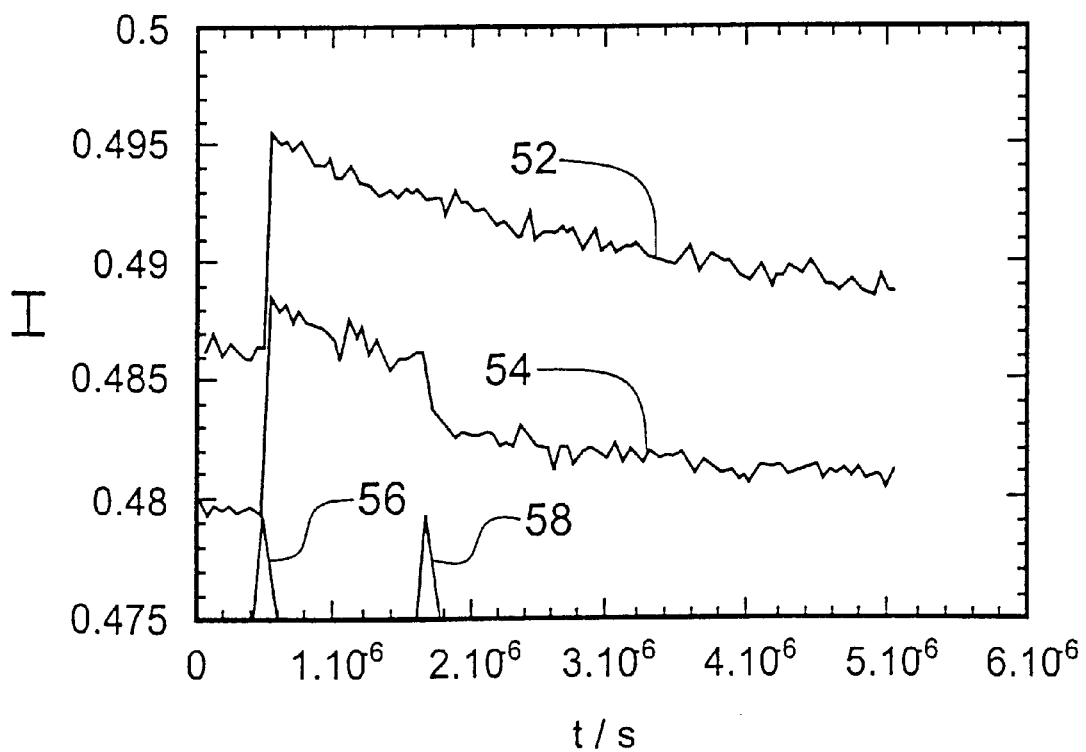
FIG. 3 is a graph of intensity of various optical signals in arbitrary units as a function of time in seconds for the apparatus of FIG. 1.

FIG. 3 is a graph of intensity I in arbitrary units of various optical signals against time in seconds showing experimental results of the "off" and "on" switching and its effect on the amplification of the signal. The experimental results are taken from the apparatus of FIG. 1. At the bottom of the graph, the above-described "on" pulse 56 (light beam 23) and "off" pulse 58 (light beam 25) are evident, the delay between the two pulses being 1 μs, as controlled by the control unit 32 shown in FIG. 1. A lower trace 54 shows the temporal evolution of an optical signal (light beam 21) before and after the "on" pulse 56, and before and after the subsequent "off" pulse 58. It can be seen that the "on" pulse triggers amplification of the signal and that the "off" pulse damps the amplification. By way of comparison, an upper trace 52 shows the temporal evolution of the signal (light beam 21) responsive to an "on" pulse which is not followed by an "off" pulse. In this case, the amplification gradually decays according to the population lifetime of the $^3B_2$ state which is the order of microseconds as already mentioned.

In practice, the apparatus is preferably to be operated such that the "on" pulse has a duration much shorter than the lifetime of the $^3B_2$ state and a pulse energy large enough to create the desired population inversion. In this case, the rise time of the amplification is limited only by the pulse duration and the time required by the excited electrons to decay to the lowest level $^3B_2$ state. The time required for decay into the lowest level $^3B_2$ state is known to be a few picoseconds [1]. It is this very short time that will represent the ultimate limit to the speed of a $Cr^{4+}$:YAG based optical gating apparatus as herein described.

As briefly mentioned above, if amplification is required for longer periods than can be provided by a single "on" pulse, the apparatus can be operated with repeated "on" pulses at a repetition frequency which will preferably be greater than the inverse of the lifetime of the $^3B_2$ state (e.g. about 300 kHz). Another option is to apply longer "on" pulses of predetermined duration.

As described by the equations derived below, the switching of the amplification process can be very rapid with the rise-time and the fall-time of the amplification generally being as fast as the "on" and "off" pulses which can be set to a duration of a few nanoseconds, for example.

The population $N_2$ of the excited $^3B_2$ state in the presence of the "off" pulse changes with time according to the equation [8]:

$$dN_2/dt = -wN_2 - N_2/\tau_{fl} \quad (1)$$

where w is the number of "off" photons per unit of time and $\tau_{fl}$ is the decay constant of the fluorescence lifetime. From equation (1) the following equation can be obtained:

$$N_2(t) = N_{20} \exp(w + 1/\tau_{fl}),$$

where $N_{20}$ is the population of the excited $^3B_2$ level before the "off" pulse is launched. Thus, the excited $^3B_2$ level population decreases with a lifetime:

$$\tau = \tau_{fl}/(1 + W\tau_{fl}) \quad (2)$$

Moreover $$w = I\sigma_{em}/h\nu$$

where hv is the photon energy, $\sigma_{em}$ is the stimulated emission cross-section and I is the "off" pulse intensity. Equation (2) can then be written:

$$\tau = \tau_{fl}/(1 + I/I_{sat}) \quad (3)$$

where $I_{sat}$ is the saturation intensity, given by $I_{sat} = h\nu/\sigma_{em}$. Whenever $I \gg I_{sat}$, equation (3) becomes:

$$\tau = 1/w.$$

Thus the lifetime of the excited level and, as a consequence, the fall time of the amplification, is of the same order of the duration of the "off" pulse. In this case, the turn off time of the switch is only limited by the "off" pulse duration.

It will be appreciated that the above-described OGG apparatus is not truly a switch in terms of the physical processes involved, since the optical signal is transmitted through the apparatus in both states of the gain medium, either with substantially no amplification or with considerable stimulated emission induced amplification. However, the apparatus is intended for configuration such that the gain contrast between the "on" and "off" conditions is so large (e.g. 30–40 dB) that transmission of the optical signal without amplification in the gain medium can be considered to be a blocking of the signal. In that way, the optical gating effectively functions as an optical switch (or tap or valve).

Figure 4:
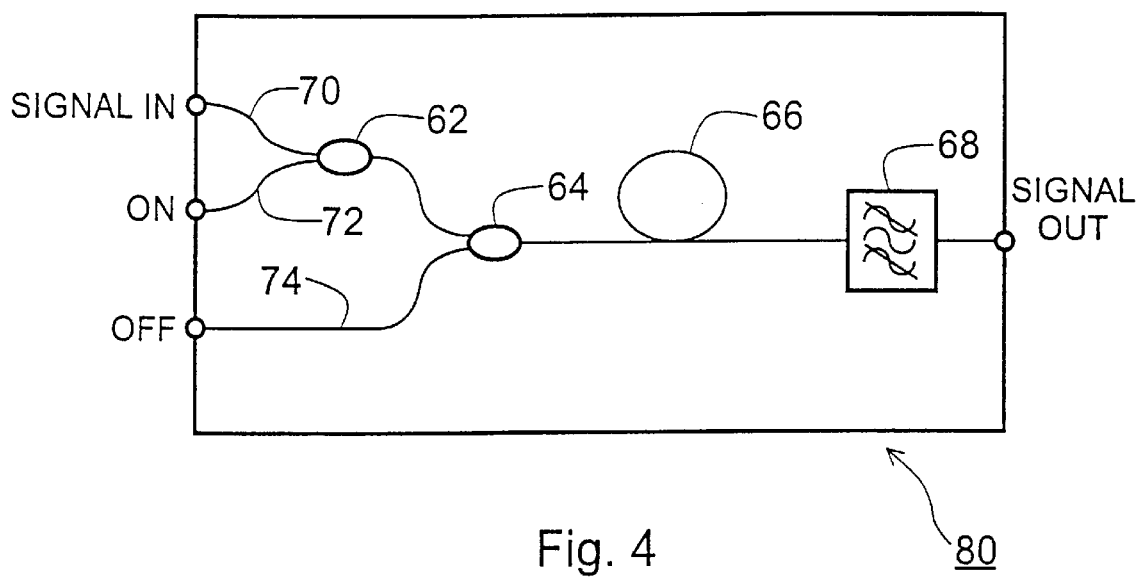
FIG. 4 is a schematic drawing of an optical gating apparatus according to a second embodiment of the invention.

FIG. 4 shows schematically an OGG according to a second embodiment of the invention. In many respects, the second embodiment can be understood as an optical fiber implementation of the free-space apparatus of the first embodiment.

The OGG 80 of the second embodiment has three inputs for receiving an input signal (SIGNAL IN), "on" pulses (ON) and "off" pulses (OFF) which will be provided by respective light sources as described with reference to the first embodiment. These light sources are omitted from the figure, to illustrate that the device features shown in FIG. 4 can form a stand-alone sub-component. Specifically, none of the components illustrated in the figure require any external electrical power supply or control connections. In that sense, the sub-component of FIG. 4 can be nominally classified as a passive device, since, although active, its active properties can all be triggered remotely, i.e. by the optical "on" and "off" pulses. If desired, the light sources for generating the "on" and "off" pulses may be positioned some distance away from the device of FIG. 4. For example, the light sources for the "on" and "off" pulses could be arranged at a major network node, e.g. at a transmitter or signal concentrator, and devices such as shown in FIG. 4 could form part of a self-routing packet transport network that only includes highly reliable components which do not require external electrical connections and do not routinely need to be maintained, serviced or replaced.

As in the first embodiment, the three optical input signals SIGNAL IN, ON and OFF are combined for co-propagation through a $Cr^{4+}$: YAG crystal. In the second embodiment, the signal combination is achieved with a cascade of first and second optical fiber couplers 62 and 64. As will be appreciated, the signal combination could be achieved with a single coupler having three inputs, or with a wide variety of other standard optical fiber components. Specifically, in the second embodiment, the SIGNAL IN and ON signals are supplied to optical fiber waveguides 70 and 72 which form first and second inputs to the first optical coupler 62, the output of which forms one input of the second optical coupler 64, the other input of which is an optical fiber waveguide 74 leading from the OFF signal input. The output of the second optical fiber coupler 64 thus serves to convey all three signals (SIGNAL IN, ON and OFF) and leads to a gain medium in the form of an optical fiber 66 containing $Cr^{4+}$:YAG where amplification of the input signal will occur under control of the "on" and "off" pulses.

In one example, the gain medium optical fiber 66 is constituted by a core of $Cr^{4+}$:YAG crystalline particles embedded in an index-matching glass, surrounded by a cladding of light retaining structure made of a suitable glass or other material [2].

In another example, the gain medium optical fiber 66 is a $Cr^{4+}$:YAG single crystal fiber. Such single crystal fibers can be obtained through the laser-heated pedestal growth technique (LHPG) [9,10]. If the single crystal fiber is orientated along the <100> growth direction, an emission as large as $1 \times 10^{-19}$ $cm^2$ is expected [1]. With a $Cr^{4+}$ doping concentration in the fiber core of about $5 \times 10^{17}$ atoms/$cm^3$ and a fiber length of 140 cm, an amplification of approximately 30 dB should be achieved. If the length of the fiber 66 is extended to 185 cm, amplification of 40 dB is predicted. It will thus be appreciated that very considerable amplification can be achieved with relatively short lengths of fiber, allowing for convenient device fabrication.

At the output of the gain medium optical fiber 66 there is provided a filter 68 for rejecting the "on" and "off" pulses and transmitting the signal to the device output, labeled SIGNAL OUT in FIG. 4.

The device of FIG. 4 will operate in a manner that will be generally understood from the description of the first embodiment with reference to FIGS. 1 to 3 to which is referred.

Figure 5:
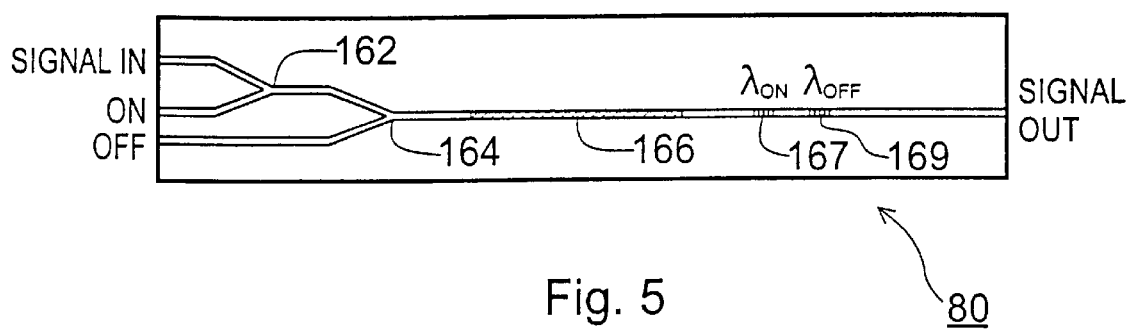
FIG. 5 is a schematic drawing of an optical gating apparatus according to a third embodiment of the invention.

FIG. 5 shows an OGG 80 according to a third embodiment which can be understood as a planar waveguide implementation of the optical fiber device of the second embodiment. The input signal IN, and the two control signals ON and OFF are combined with a cascade of first and second Y-couplers 162 and 164 arranged similarly to the fiber couplers of the second embodiment. A gain medium 166 is provided by $Cr^{4+}$ doping of a section of the waveguide leading from the output of the second Y-coupler 164. Output filtering to reject the ON and OFF signals is provided by first and second Bragg gratings 167 and 169 respectively that are arranged in line in the waveguide continuation of the $Cr^{4+}$ doped section. The third embodiment will be further understood with reference to the above description of the first and second embodiments.

Figure 6:
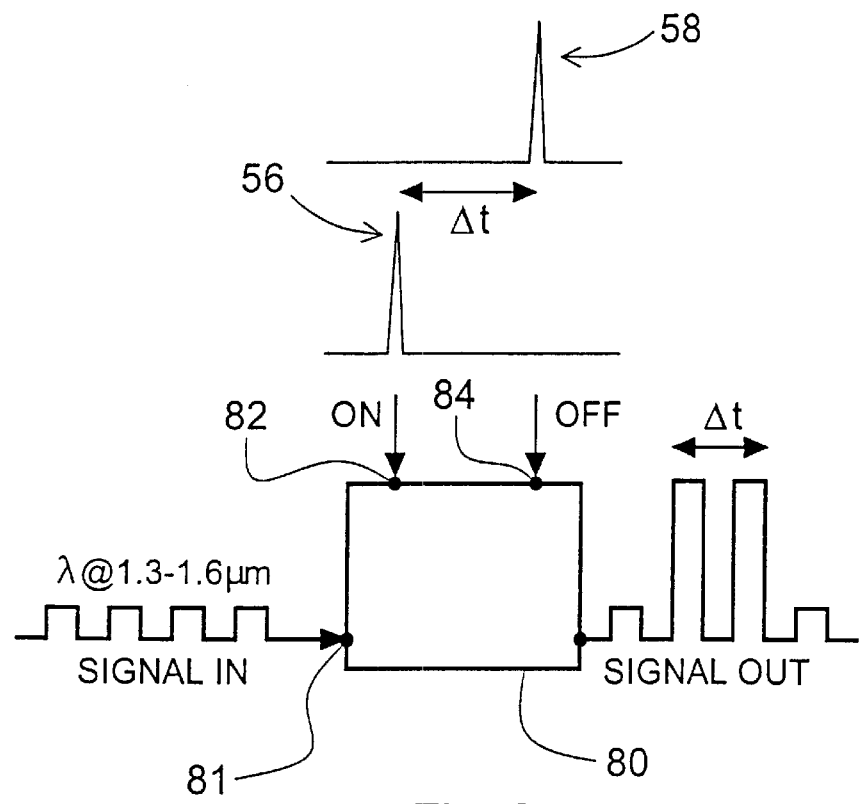
FIG. 6 is a schematic drawing of a first example of the optical gating apparatus in a system context.

FIG. 6 is a schematic drawing of a first example of an OGG according to any of the above-described embodiments in a system context. A $Cr^{4+}$:YAG based OGG 80 is employed to gate an input signal SIGNAL IN delivered to an input connection 81, the input signal being depicted as a pulse train. The input signal enters the OGG 80 via the input connection 81 and experiences amplification responsive to delivery of an ON pulse at 1064 nm to a control connection 82. An amplification of 30–40 dB will provide a signal-to-noise ratio sufficient for many applications. The amplification process is quenched responsive to delivery of a 1450 nm OFF pulse at a further control connection 84. The duration of amplification is equal to the delay Δt between the "on" and "off" pulses, and is thus externally controllable. In the figure, the selective gating is illustrated schematically at the output by the amplification of two pulses in a train of four pulses. In reality, the amplification will, for example, be of a selected number of data packets of a packet switching protocol such as ATM (Asynchronous Transfer Mode). Advantageously, the amplification bandwidth of $Cr^{4+}$:YAG allows gating in a wavelength range between 1.3 and 1.6 microns, i.e. across both the second and third telecommunication windows, as indicated by the labeling of the input signal in the figure.

Figure 7:
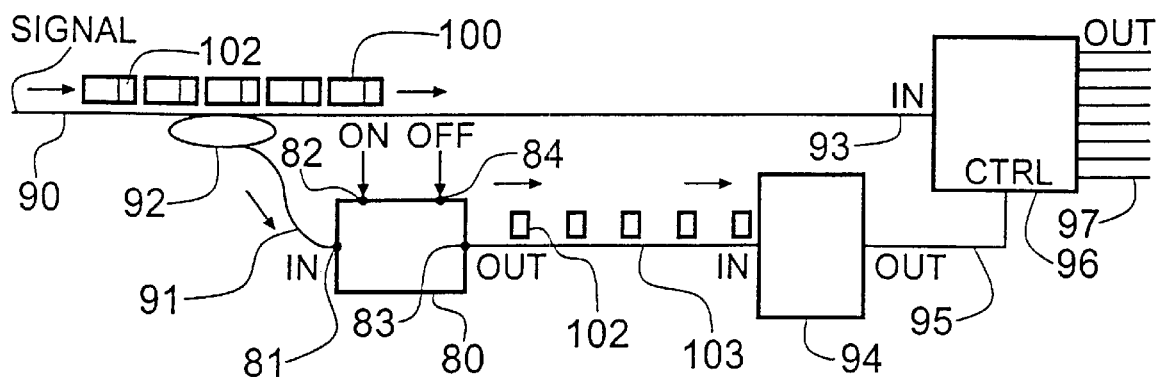
FIG. 7 is a schematic drawing of a second example of the optical gating apparatus in a system context.

FIG. 7 is a schematic drawing of a second example of how an OGG according to any of the above-described embodiments may be incorporated in a system. An optical transmission line 90 is arranged for transmission of optical signals in the form of cells or packets 100. One example is a data transfer system operating using the asynchronous ATM operating protocol. Each ATM cell 100 contains a header 102. An optical coupler 92 is arranged in the transmission line 90 to split off a portion of the ATM signal into a branch line 91. The optical signal is thus duplicated with one set of the duplicate cells continuing to propagate down the transmission line 90 and the other set of duplicate cells down the branch line 91. The branch line 91 leads to an input 81 of a $Cr^{4+}$:YAG based OGG 80 according to one of the embodiments of the invention. The OGG 80 serves to amplify the input signal IN responsive to delivery of an ON pulse at 1064 nm to a control connection 82 and a 1450 nm OFF pulse received at a further control connection 84. The duration of amplification is equal to the delay Δt between the ON and OFF pulses, and is thus externally controllable. This operation of the OGG 80 will be understood from the above-described embodiments.

In use, the OGG 80 is controlled by synchronizing the ON and OFF pulses to provide amplification only for the header portions of the ATM cells. The optical signal OUT output from the OGG 80 at output 83 will thus effectively consist only of the ATM header portions 102. The output 83 is connected to an optical signal line 103 leading to an input of an optical correlator 94. The optical correlator 94 is configured to read the header information and drive an optical cross-connect 96 according to the header information via a further optical signal line 95 leading from an output of the optical correlator 94 to a control input of the optical cross-connect 96. The optical cross-connect 96 additionally has an input 93 connected to the main optical transmission line 90 and is configured to route the ATM cells 100 received at the input 93 to one of a plurality of outputs 97 responsive to the control signal CTRL received from the optical correlator 94. In other words, ATM cells input to the optical cross-connect 96 are addressed to the appropriate output line 97 as determined by the optical correlator 94.

The system according to the second example is protocol transparent (similar to the first system example). As well as being applicable to asynchronous protocols such as ATM, it can be used for synchronous protocols. Specific examples of other protocols that can be used are IP (Inter Protocol) and SDH-SONET (Synchronous Digital Hierarchy—Synchronous Optical Network).

Further devices based on the principles employed in the router of FIG. 7 may be envisaged in which cells or parts of cells (other than headers) can be selectively extracted from a signal train using ON and OFF signals appropriately triggered from a local or a remote controller.

In alternative embodiments of the invention, $Cr^{4+}$ can be doped into different host crystals, instead of YAG. By selecting different host crystals, different wavelength ranges of amplification can be achieved. However, $Cr^{4+}$ in YAG is considered to be the best choice for telecommunications applications, since it is the only host known to the inventors that certainly provides amplification across both the second and third telecommunications windows, although others may exist.

Other $Cr^{4+}$ host crystals are known for providing amplification in the second and/or the third telecom windows. Examples of such $Cr^{4+}$ host crystals are $Y_2SiO_5$, $Mg_2SiO_4$, $LiNbGeO_5$, $Y_3Al_5O_{12}$: CaO, $Y_3(Al,Sc)_2Al_3O_{12}$:CaO, $Y_3Sc_2Al_3O_{12}$:CaO, $Ca_2SiO_4$, $Ca_2GeO_4$ and $LiAlO_2$, see reference [2], FIG. 1.17 of reference [12] and Table 1 of reference [14].

In further alternative embodiments of the invention, $Cr^{4+}$ can be replaced with another transition metal dopant, such as $V^{4+}$ in a YAG or other host matrix, for example one of the above-listed host crystals. By selecting different transition metals, different wavelength ranges of amplification can be achieved. Examples of such transition metal ions are $V^{2+}$ which can amplify in the wavelength range 1.05–1.33 μm, $Ni^{2+}$ that can amplify in the wavelength range 1.314–1.939 μm, and $Co^{2+}$ which can amplify in the wavelength range 1.62–2.5 μm (see Table 1.10 of reference [12]).

The emission of $Cr^{4+}$-doped garnets is detailed further in reference [13].

REFERENCES

[1] A Sennaroglu, C R Pollock, H Nathel, Journal of the Optical Society of America B, vol. 12, pages 930–937 (1995)

[2] U.S. Pat. No. 5,717,517: R R Alfano, V V Petricevic and Ping Pel Ho

[3] P Myslinski, C W Barnard, J Chrostowski, Fiber and Integrated Optics vol. 14, pages 83–88 (1995)

[4] P Myslinski, C W Barnard, G Cheney, J Chrostowski, B Syrett, J Glinski, Optics Communications, vol. 97, pages 340–346 (1993)

[5] I T Mc Kinnie, J C Deittrich, R T White, D M Warrington, SPIE vol. 3265, pages 295–305

[6] I T Mc Kinnie, M J Davies, Pure Appl. Opt. vol. 6, pages 759–772 (1997)

[7] Y Kalisky, A Ben-Amar Baranga, Y Shimony, M R Kotka, Optical Materials vol. 8, pages 129–134 (1997)

[8] O Svelto, "Principles of Lasers" Third Edition, 1989 New York Press, New York pages 62–65.

[9] S Ishibashi, K Naganuma, I Yokoham, Journal of Crystal Growth, vol. 183, pages 614–621

[10] U.S. Pat. No. 5,690,735: Becker

[11] A Suda et al: IEEE Journal of Quantum Electronics, vol. 35, no. 10, pages 1548–1553 (1999)

[12] AA Kaminskii, Crystalline Lasers: Physical Processes and Operating Schemes, page 52, FIG. 1.17 & page 29, Table 1.10, CRL Press, New York (1996), ISBN 0-8493-3720-8

[13] S Kueck et al, Physical Review B, vol. 51, page 17323–17331 (1995)

[14] T Kellner et al, Applied Optics, vol. 37, pages 7076–7084 (1998)

What is claimed is:

1. An apparatus for gating an optical signal comprising:
   (a) an input stage arranged to receive and combine first and second optical control signals of first and second wavelengths, and an optical signal to be gated of a third wavelength;
   (b) a gain medium arranged to receive from the input stage the first and second optical control signal and the optical signal to be gated, the gain medium comprising a transition metal dopant that has an excited state populatable by the first optical control signal and depopulatable by the second optical control signal to allow selective amplification of the optical signal to be gated by stimulated emission from the excited state responsive to the first and second optical control signals; and
   (c) an output stage for transmitting the optical signal after gating in the gain medium.

2. An apparatus according to claim 1, further comprising:
   a first light source for generating the first optical control signal at a first wavelength for populating the excited state of the transition metal dopant so as to provide amplification of the optical signal at the third wavelength; and
   a second light source for generating the second optical control signal at a second wavelength for depopulating the excited state of the transition metal dopant so as to suppress amplification of the optical signal at the third wavelength.

3. An apparatus according to claim 2, wherein the input stage and the gain medium are operable over a range of values of the third wavelength encompassing the third telecommunications window.

4. An apparatus according to claim 2, wherein the input stage and the gain medium are operable over a range of values of the third wavelength encompassing the second telecommunications window.

5. An apparatus according to claim 2, wherein the input stage and the gain medium are operable over a range of values of the third wavelength encompassing the second and third telecommunications windows.

6. An apparatus according to claim 1, wherein the input stage and the gain medium are operable over a range of values of the third wavelength encompassing the third telecommunications window.

7. An apparatus according to claim 1, wherein the input stage and the gain medium are operable over a range of values of the third wavelength encompassing the second telecommunications window.

8. An apparatus according to claim 1, wherein the input stage and the gain medium are operable over a range of values of the third wavelength encompassing the second and third telecommunications windows.

9. An apparatus according to claim 1, wherein the output stage comprises a filter for rejecting the first and second optical control signals and transmitting the optical signal.

10. An apparatus according to claim 1, wherein the transition metal dopant is $Cr^{4+}$.

11. An apparatus according to claim 1, wherein the gain medium comprises YAG (Yttrium Aluminum Garnet) as a host crystal for the transition metal dopant.

12. An apparatus according to claim 1, wherein at least one of the gain medium, the input stage and the output stage is located in an optical fiber.

13. An apparatus according to claim 1, wherein at least one of the gain medium, the input stage and the output stage is located in a planar waveguide.

14. A method of gating an optical signal comprising:

(a) inputting an optical signal to be gated into a gain medium comprising a transition metal dopant;

(b) applying a first control signal to the gain medium to populate an excited state of the transition metal dopant, thereby to induce amplification of the optical signal by stimulated emission; and (c) applying a second control signal to the gain medium to depopulate the excited state of the transition metal dopant, thereby to suppress the amplification of the optical signal.

15. A method according to claim 14, wherein the gain medium provides the amplification over a wavelength range encompassing the second telecommunications window.

16. A method according to claim 14, wherein the gain medium provides the amplification over a wavelength range encompassing the third telecommunications window.

17. A method according to claim 14, wherein the gain medium provides the amplification over a wavelength range encompassing the second and third telecommunications windows.

18. A method according to claim 14, further comprising filtering out the first and second control signals from the optical signal after passing through the gain medium.

19. A method according to claim 14, wherein the transition metal dopant is $Cr^{4+}$.

20. A method according to claim 14, wherein the gain medium comprises YAG (Yttrium Aluminum Garnet) as a host crystal for the transition metal dopant.

21. A method according to claim 14, wherein the first control signal is provided by a first light source having an output at a first wavelength at which there is a first allowed optical transition of the transition metal dopant into the excited state, and wherein the second control signal is provided by a second light source having an output at a second wavelength at which there is a second allowed optical transition of the transition metal dopant out of the excited state.

* * * * *